(12) United States Patent
Maruyama

(10) Patent No.: US 8,339,564 B2
(45) Date of Patent: Dec. 25, 2012

(54) LIQUID CRYSTAL DISPLAY AND METHOD OF MANUFACTURING THE SAME

(75) Inventor: Tomoko Maruyama, Kanagawa (JP)

(73) Assignee: Sony Corporation (JP)

( * ) Notice: Subject to any disclaimer, the term of this patent is extended or adjusted under 35 U.S.C. 154(b) by 327 days.

(21) Appl. No.: 12/660,285

(22) Filed: Feb. 24, 2010

(65) Prior Publication Data

US 2010/0225871 A1   Sep. 9, 2010

(30) Foreign Application Priority Data

Mar. 4, 2009   (JP) ................ P2009-050344

(51) Int. Cl.
*G02F 1/1339*   (2006.01)
(52) U.S. Cl. ............ 349/153; 349/53; 349/84; 349/155; 349/156; 349/158
(58) Field of Classification Search ............ 349/53, 349/84, 153, 155, 156, 158
See application file for complete search history.

(56) References Cited

U.S. PATENT DOCUMENTS 5,978,065 A   11/1999   Kawasumi et al.

FOREIGN PATENT DOCUMENTS

| JP | 10-186384 A | 7/1998 |
| JP | 2007-304630 A | * 11/2007 |

* cited by examiner

*Primary Examiner* — Jennifer Doan
(74) *Attorney, Agent, or Firm* — Lerner, David, Littenberg, Krumholz & Mentlik, LLP

(57) ABSTRACT

A liquid crystal display includes: a pair of substrates having display regions in positions facing each other and surrounding regions around the display regions, respectively, one of the pair of substrates including a wire made of a material blocking an ultraviolet ray in the surrounding region; a liquid crystal layer sandwiched between the pair of substrates; and a sealing layer arranged so as to overlap a part or the whole of the wire in a direction where the pair of substrates face each other, and sealing the liquid crystal layer, in which the sealing layer is made of a light-curable resin or a combination type resin and includes a photopolymerization initiator, and the content of the photopolymerization initiator is within a range of 0.01 wt % to 1 wt %, and the photopolymerization initiator has a wavelength peak of 320 nm to 420 nm.

5 Claims, 10 Drawing Sheets

LIQUID CRYSTAL DISPLAY AND METHOD OF MANUFACTURING THE SAME

CROSS-REFERENCE TO RELATED APPLICATION

The present application claims priority from Japanese Patent Application No. JP JP 2009-050344 filed in the Japanese Patent Office on Mar. 4, 2009, the entire content of which is incorporated herein by reference.

BACKGROUND OF THE INVENTION

1. Field of the Invention

The present invention relates to a liquid crystal display manufactured by a one drop fill method and a method of manufacturing the liquid crystal display.

2. Description of the Related Art

A typical liquid crystal display includes a liquid crystal layer between a drive substrate and an opposed substrate. A TFT (Thin Film Transistor) device layer, a pixel electrode layer, a planarization layer and an alignment film are arranged on the drive substrate (a TFT substrate). On the other hand, a BM (Black Matrix) layer (a frame region), a CF (Color Filter) layer, a common electrode and an alignment film are arranged on the opposed substrate. Moreover, a sealing layer is arranged between the drive substrate and the opposed substrate so as to adhere the substrates together and to prevent liquid crystal leakage.

As a method of forming a liquid crystal layer between a pixel substrate and an opposed substrate in a liquid crystal display with such a configuration, a vacuum injection method in which the pixel substrate and the opposed substrate are bonded together, and then a liquid crystal is injected is used. However, the method needs a long time to inject the liquid crystal, so there is an issue that when the areas of the substrates increase, productivity becomes poor.

To solve the issue, a method called an ODF (One Drop Fill) method has been developed. For example, as described in Japanese Unexamined Patent Application Publication No. 10-186384, in the method, a liquid crystal material is dropped on one of two substrates before bonding the two substrates together for sealing. In the ODF method, as a material (a sealant) forming a sealing layer, a UV (ultraviolet)-curable sealant or a combination type sealant is used. Moreover, Japanese Unexamined Patent Application Publication No. 10-186384 also discloses that the liquid crystal is dropped, and two substrates are bonded together, and then the liquid crystal is spread by a pressure roller so as to easily seal the liquid crystal between the substrates for a short time. Thereby, mass production of the liquid crystal displays is allowed, and in the case of small- to medium-size liquid crystal displays, an injection opening for sealing the liquid crystal is not necessary, so a substrate thickness for sealing the injection opening is not necessary, thereby a reduction in profiles of the liquid crystal displays is allowed.

SUMMARY OF THE INVENTION

However, in the above-described method in related art, a liquid crystal in a region surrounded by a sealant comes into contact with the sealant which is not cured yet, thereby the liquid crystal is contaminated by the contact, and there is a high possibility that an alignment film is also contaminated. When an ultraviolet ray is applied to cure the sealant in such a state, misalignment occurs in the vicinity of the sealant, that is, around a panel, thereby to exert an influence on image characteristics, and to reduce reliability of a liquid crystal panel.

It is desirable to provide a liquid crystal display which is allowed to prevent a decline in image characteristics caused by a sealant, and a method of manufacturing the liquid crystal display.

According to an embodiment of the invention, there is provided a liquid crystal display including the following components (A1) to (C1):

(A1) a pair of substrates having display regions in positions facing each other and surrounding regions around the display regions, respectively, one of the pair of substrates including a wire made of a material blocking an ultraviolet ray in the surrounding region;

(B1) a liquid crystal layer sandwiched between the pair of substrates; and (C1) a sealing layer arranged so as to overlap a part or the whole of the wire in a direction where the pair of substrates face each other, and sealing the liquid crystal layer, in which the sealing layer is made of a light-curable resin or a combination type resin and includes a photopolymerization initiator, and the content of the photopolymerization initiator is within a range of 0.01 wt % to 1 wt %, and the photopolymerization initiator has a wavelength peak of 320 nm to 420 nm.

According to an embodiment of the invention, there is provided a method of manufacturing a liquid crystal display including the following steps (A2) to (D2):

(A2) forming a sealing layer with a ring shape in a surrounding region of one of a pair of substrates, the sealing layer being made of a light-curable resin or a combination type resin, the pair of substrates having display regions in positions facing each other and the surrounding regions around the display regions, respectively;

(B2) dropping a liquid crystal in a region surrounded by the sealing layer;

(C2) superimposing the pair of substrates under a reduced pressure, and then returning the pressure to an atmospheric pressure, thereby to form a liquid crystal layer between the pair of substrates; and (D2) curing the sealing layer by light irradiation after forming the liquid crystal layer, in which the light-curable resin or the combination type resin includes a photopolymerization initiator, and the content of the photopolymerization initiator is within a range of 0.01 wt % to 1 wt %, and the photopolymerization initiator has a wavelength peak of 320 nm to 420 nm.

In the liquid crystal display and the method of manufacturing a liquid crystal display according to the embodiment of the invention, a sealant made of a light-curable resin or a combination type resin including a photopolymerization initiator is used for the sealing layer sealing the liquid crystal layer. The content of the photopolymerization initiator in the resin is 0.01 wt % to 1 wt %, and the wavelength peak of the photopolymerization initiator is 320 nm to 420 nm, so the sealant is efficiently cured.

In the liquid crystal display and the method of manufacturing a liquid crystal display according to the embodiment of the invention, as the sealing layer sealing the liquid crystal layer, a sealant made of a light-curable resin or a combination type resin including a photopolymerization initiator is used, and the content of the photopolymerization initiator is 0.01 wt % to 1 wt %, and the photopolymerization initiator has a wavelength peak of 320 nm to 420 nm, so the sealant is efficiently curable, and the reliability of a display panel is allowed to be improved.

Other and further objects, features and advantages of the invention will appear more fully from the following description.

DETAILED DESCRIPTION OF THE PREFERRED EMBODIMENTS

Preferred embodiments will be described in detail below referring to the accompanying drawings. Descriptions will be given in the following order.

First Embodiment
(1) Whole configuration of liquid crystal display panel
(2) Method of manufacturing liquid crystal display panel
Second Embodiment (an example in which an opening for allowing an ultraviolet ray to pass therethrough is arranged in a wire)
Modification (an example in which a transparent layer is arranged in an opening)

First Embodiment

Figure 1:
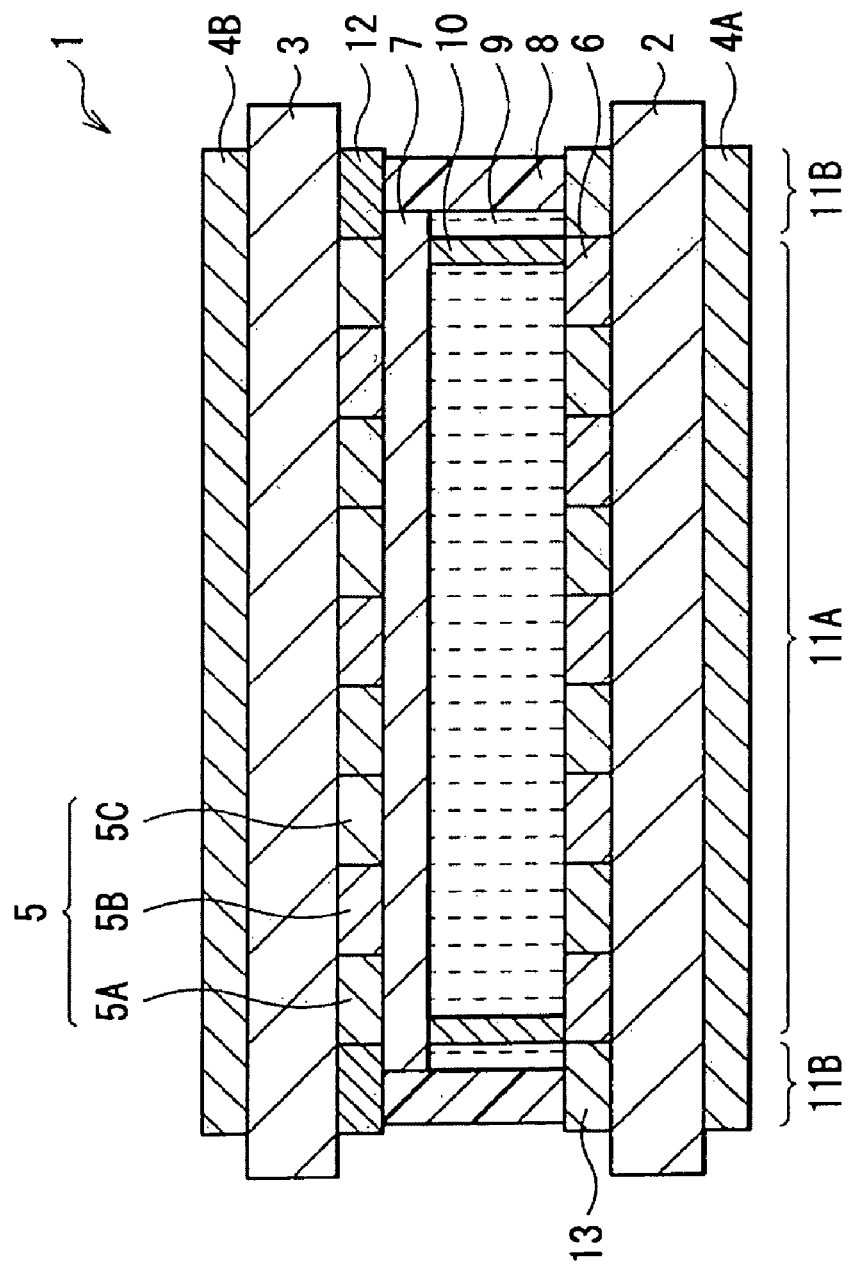
FIG. 1 is a sectional view illustrating a configuration of a liquid crystal display according to a first embodiment of the invention.
Figure 2:
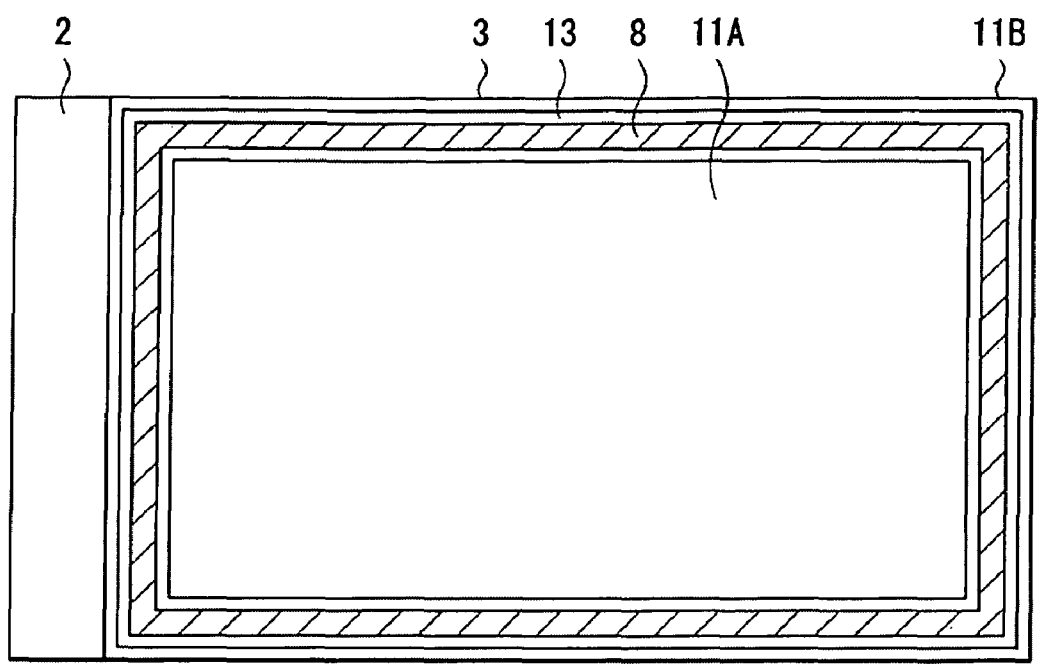
FIG. 2 is a plan view illustrating the whole configuration of a panel.

The present invention will be described mainly referring to a transmissive liquid crystal display panel, but the invention is also applicable to a semi-transmissive liquid crystal display panel and a reflective liquid crystal display panel.
Whole Configuration FIG. 1 illustrates a sectional view of a transmissive liquid crystal display panel (a liquid crystal display) 1 according to an embodiment of the invention, and FIG. 2 illustrates a plan view of the whole panel 1. The liquid crystal display panel 1 includes a liquid crystal layer 9 sealed between a TFT substrate (a drive substrate) 2 and an opposed substrate 3 by a sealing layer 8.

The TFT substrate 2 and the opposed substrate 3 have display regions (pixel regions) 11A in positions facing each other, and a region surrounding each display region 11A is a surrounding region 11B. The sealing layer 8 is arranged in the surrounding region 11B so as to seal the liquid crystal layer 9 arranged in the display region 11A.

Figure 3A:
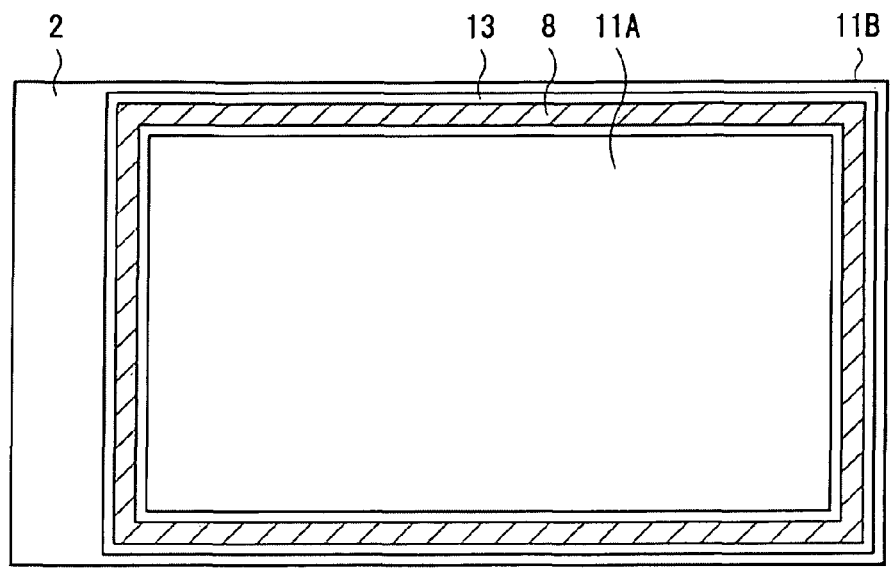
FIGS. 3A and 3B are plan views illustrating a configuration of a TFT substrate.
Figure 3B:
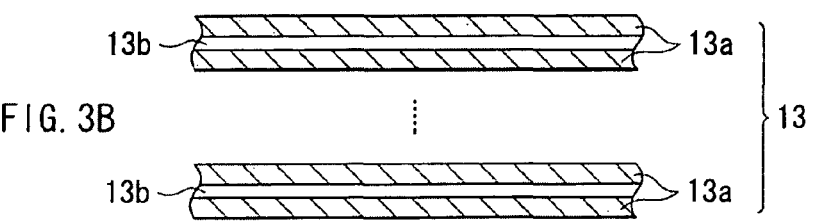

FIG. 3A illustrates a plan view of the TFT substrate and FIG. 3B illustrates an enlarged view of a part of a surrounding wire 13 in FIG. 3A. The TFT substrate 2 includes, for example, a plurality of pixel electrodes 6 arranged in a matrix form on a glass substrate. TFT devices for driving the plurality of pixel electrodes 6, respectively, and gate lines, source lines and the like (all not illustrated) connected to the TFT devices are further arranged on the TFT substrate 2. The pixel electrodes 6 are formed of, for example, a conductive material having transparency such as ITO (indium tin oxide), and are arranged for sub-pixels (not illustrated) on the glass substrate, respectively.

The surrounding wire 13 for driving pixels in the display region 11A is arranged in the surrounding region 11B of the TFT substrate 2, and the sealing layer 8 is arranged on the surrounding wire 13. In this case, as illustrated in an enlarged view of FIG. 3B, the surrounding wire 13 is configured of a plurality of wires 13a arranged in parallel to one another. An ultraviolet ray entering from the TFT substrate 2 is applied to the sealing layer 8 through a space 13b between the wires 13a. The wires 13a are formed of a material which does not allow the ultraviolet ray to pass therethrough, for example, metal such as aluminum (Al) or titanium (Ti).

Figure 4:
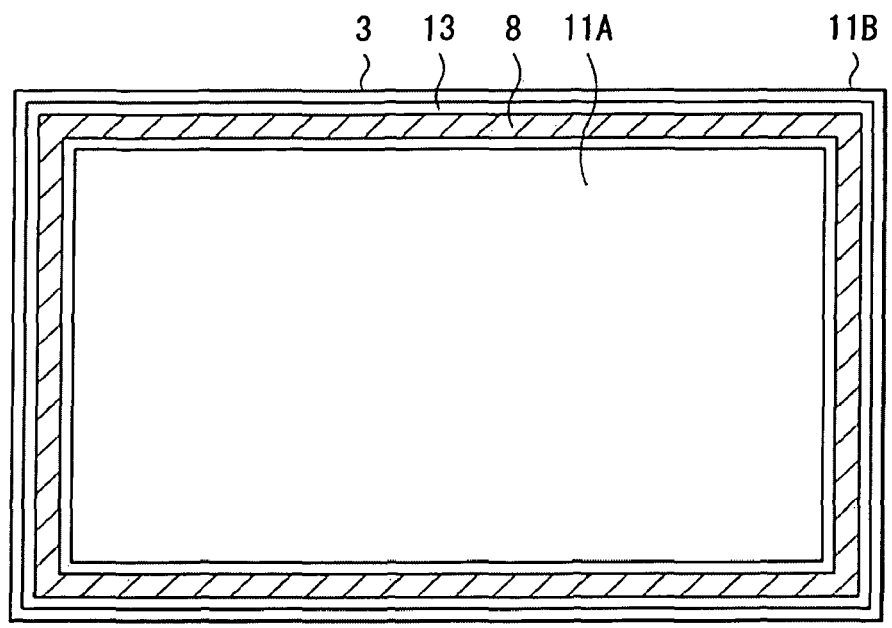
FIG. 4 is a plan view illustrating a configuration of an opposed substrate.

FIG. 4 illustrates a plan view of the opposed substrate 3. The opposed substrate 3 includes a color filter in which, for example, filters of red (R), green (G) and blue (B) are arranged in stripes on a glass substrate, and includes an opposed electrode 7 on substantially the whole effective display region on the color filter 5. The opposed electrode 7 is made of, for example, a conductive material having transparency such as ITO (Indium Tin Oxide). A spacer for keeping a gap between both substrates is arranged between the opposed electrode 7 and the pixel electrodes 6 in the TFT substrate 2. The spacer 10 is formed of, for example, a negative photosensitive resin.

A light-shielding film (a frame or a black matrix) 12 is arranged in the surrounding region 11B surrounding the color filter 5 of the opposed substrate 3. The sealing layer is arranged between the light-shielding film 12 and the surrounding wire 13 on the TFT substrate 2.

A polarizing plate 4A is arranged on a back surface of the TFT substrate 2, and a polarization plate 4B is arranged on a top surface of the opposed substrate 3. The polarizing plates 4A and 4B allow polarized light vibrating in a specific direction to pass therethrough.

For example, in the case where the liquid crystal layer 9 is of a vertical alignment mode, the liquid crystal layer 9 includes liquid crystal molecules having negative dielectric anisotropy and a polymer structure holding the liquid crystal molecules in proximity to an interface with an alignment film (not illustrated). The liquid crystal molecules have such a property that a dielectric constant in a long axis direction is larger than that in a short axis direction. By the property, when a drive voltage is off, the long axes of the liquid crystal molecules are aligned in a direction perpendicular to a substrate, and when the drive voltage is on, the long axes of the liquid crystal molecules are aligned in a direction parallel to the substrate. Thereby, an image is displayed on a liquid crystal display panel.

Figure 5:
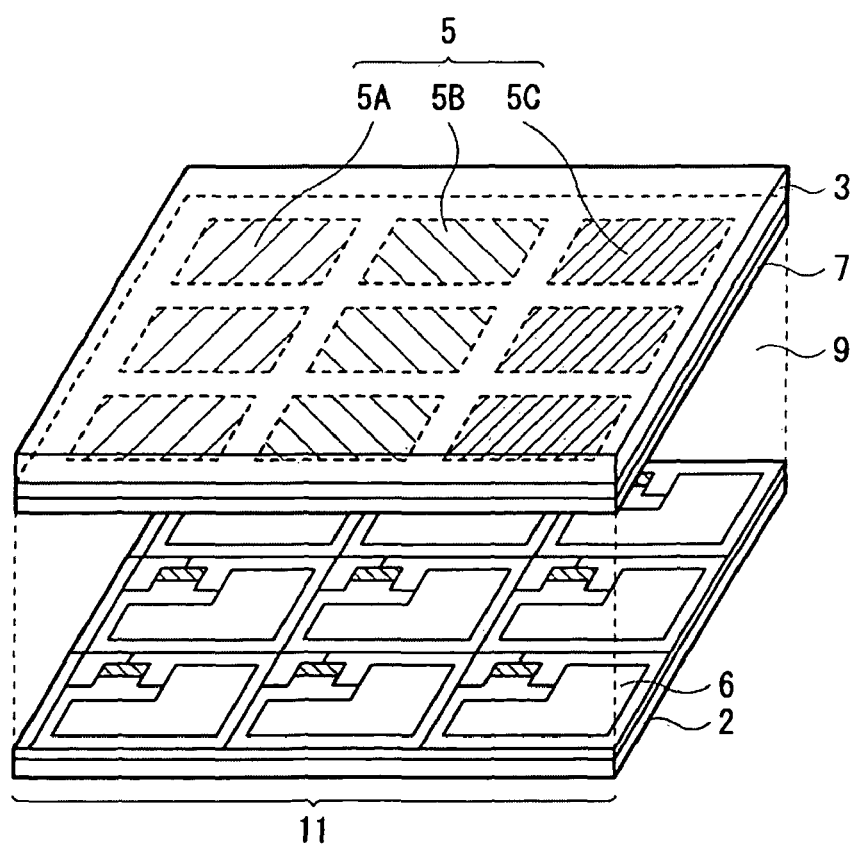
FIG. 5 is an exploded perspective view of a liquid crystal panel.

FIG. 5 illustrates a perspective view of the TFT substrate 2 and the opposed substrate 3 in the liquid crystal panel 1 illustrated in FIG. 1. In this case, a state in which the pixel electrodes 6 are formed for pixels on the TFT substrate 2, respectively, is illustrated. Moreover, red (R), green (G) and blue (B) color filters 5A to 5C are arranged for pixels on the opposed substrate 3, respectively.

The sealing layer 8 is made of, for example, a sealant of a combination type resin. The combination type resin includes a light-curable resin and a thermosetting resin, and is cured by UV irradiation and heating. Moreover, a sealant of a light-curable resin may be used. As the light-curable resin, for example, an ultraviolet-curable acrylic resin is used. As the thermosetting resin, for example, an epoxy resin is used.

The light-curable resin and the combination type resin include a photopolymerization initiator, and the content of the photopolymerization initiator (in the whole resin) is preferably 0.01 wt % to 1 wt %, and the photopolymerization initiator preferably has a wavelength peak of 320 nm to 420 nm. Thereby, the sealant is effectively curable. Description about the sealant will be given below.

When a sealant (an UV epoxy resin) including a commonly used photopolymerization initiator (mainly having a wavelength peak on a short wavelength side) at a content of 3 wt % is used to manufacture a liquid crystal panel, the photopolymerization initiator is eluted into the liquid crystal panel to cause burn-in and misalignment of liquid crystal molecules. Results in the case where sealants including the photopolymerization initiator at a concentration of 0.001 wt %, 0.1 wt %, 1 wt % and 3 wt % were used to manufacture liquid crystal panels are described as below. The following curing rate is a curing rate in condition that the sealant is sufficiently irradiated with UV light.

In the case where the photopolymerization initiator was included at a content of 0.001 wt %, the curing rate of the sealant was approximately 80%, and an uncured component of the sealant, specifically an epoxy component was easily eluted into the liquid crystal panel. Thereby, misalignment gradually occurred from a part around the perimeter of the liquid crystal panel, thereby to eventually cause a decline in contrast. In the case where the photopolymerization initiator was included at a content of 0.01 wt %, the curing rate of the sealant was approximately 95% or over, and any influence on other materials in the liquid crystal panel was not observed, and the liquid crystal panel with good display characteristics was obtained. Also in the case where the photopolymerization initiator was included at a content of 1 wt %, the curing rate of the sealant was 97% or over, and any influence on other materials in the liquid crystal panel was not observed, and the liquid crystal panel with good display characteristics was obtained. Finally, in the case where the photopolymerization initiator was included at a content of 3 wt %, as the curing rate of the sealant, nearly 100% was obtained. However, low molecules such as the photopolymerization initiator are easily eluted into a liquid crystal, thereby to cause misalignment around the sealing layer 8, that is, around the perimeter of the panel. Moreover, the misalignment may occur along a wire. It is considered that the influence of a sealant component eluted into the liquid crystal layer causes a display failure such as burn-in. Therefore, it is clear from the above results that when the content of the photopolymerization initiator is 0.01 wt % to 1 wt %, while the elution of the polymerization initiator into the liquid crystal is prevented, the curing rate of the sealant is allowed to be increased. In other words, a superior liquid crystal display panel with high display quality is obtainable.

Figure 13:
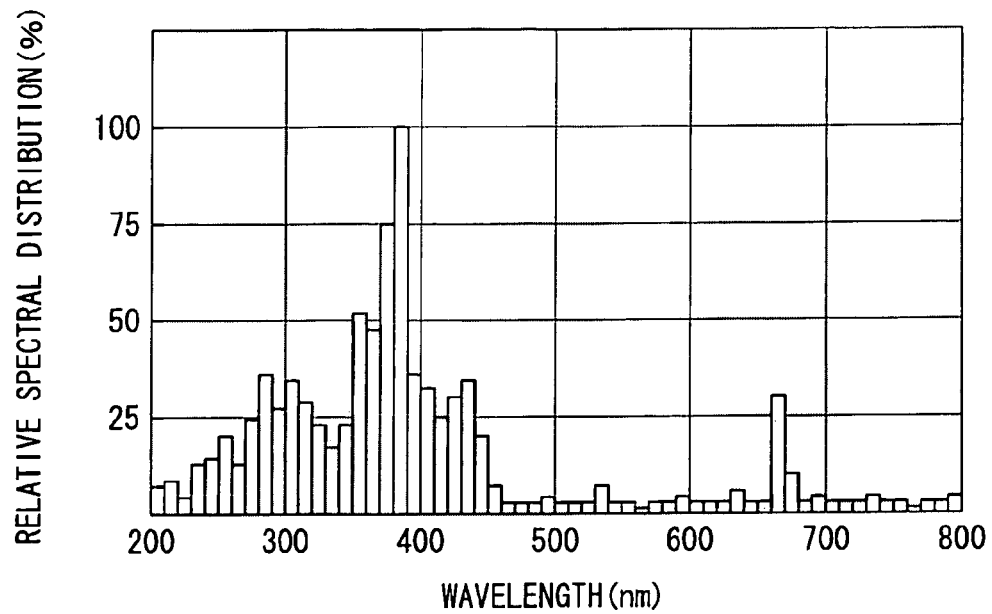
FIG. 13 is a graph illustrating a relative spectral distribution of a UV lamp.

Next, the range of the wavelength peak of the photopolymerization initiator will be described below. FIG. 13 is a graph illustrating a relative spectral distribution of an UV lamp. Liquid crystal panels were manufactured using sealants including photopolymerization initiators having the above-described wavelength peak of 320 nm to 420 nm and a wavelength peak of around 320 nm to 420 nm based on the graph. Results are as described below.

In the case where a photopolymerization initiator having a shorter wavelength peak than 320 nm was included at a content of 3 wt %, a sealing material was efficiently cured because of high reactivity. However, the photopolymerization initiator easily exerts an adverse influence on an organic material in the liquid crystal panel, for example, a liquid crystal material, an alignment film material or the like. Thereby, in the liquid crystal panel manufactured using the sealant, a display failure easily occurred, and a decline in reliability was observed. In addition, in the case where the same study was executed in the case where the photopolymerization initiator having a shorter wavelength peak than 320 nm was included at a content in the above-described range of 0.01 wt % to 1 wt % in addition to a content of 3 wt %, the same tendency was observed.

In the case where a photopolymerization initiator having a wavelength peak of 320 nm to 420 nm was included at a content of 0.01 wt % to 1 wt %, a liquid crystal panel without misalignment was obtained.

In the case where a photopolymerization initiator having a longer wavelength peak than 420 nm is included, it takes time to sufficiently cure the sealant, so there is a possibility that a main component of the sealant is eluted into the liquid crystal panel. Under such a condition, misalignment of liquid crystal molecules occurs around the perimeter of the liquid crystal panel, thereby it is difficult to perform a normal operation.

It is clear from the above-described results that the photopolymerization initiator included in the light-curable resin or the combination type resin preferably has a wavelength peak of 320 nm to 420 nm, and the content of the photopolymerization initiator is preferably within a range of 0.01 wt % to 1 wt %. Moreover, for example, a photopolymerization initiator having a wavelength peak of 380 nm is most preferable.

In such a configuration, in the liquid crystal display panel 1 according to the embodiment, when a predetermined voltage is applied to the pixel electrodes 6 and the opposed electrode 7 arranged one above the other, the liquid crystal layer 9 is driven to display an image.

Manufacturing Method

A method of manufacturing the liquid crystal display panel 1 according to the embodiment will be described referring to a flow chart of FIG. 6 and FIGS. 7 to 12.

First, necessary members for forming the liquid crystal display panel 1 are formed on a transparent substrate made of glass or the like. In other words, two transparent substrates are prepared, and TFTs, drain bus lines, gate bus lines (all not illustrated), the pixel electrodes 6 and the like are formed on one of the transparent substrates, and an alignment film (not illustrated) is formed thereon to obtain a large TFT substrate 14 (the TFT substrate 2). The color filter 5 of R (red), G (green) and B (blue) and the opposed electrode 7 configured of an ITO film are formed in predetermined positions on the other transparent substrate, and an alignment film (not illustrated) is formed thereon, and the light-shielding film 12 is formed around the alignment film, thereby a large opposed substrate 15 (the opposed substrate 3) is obtained.

Figure 6:
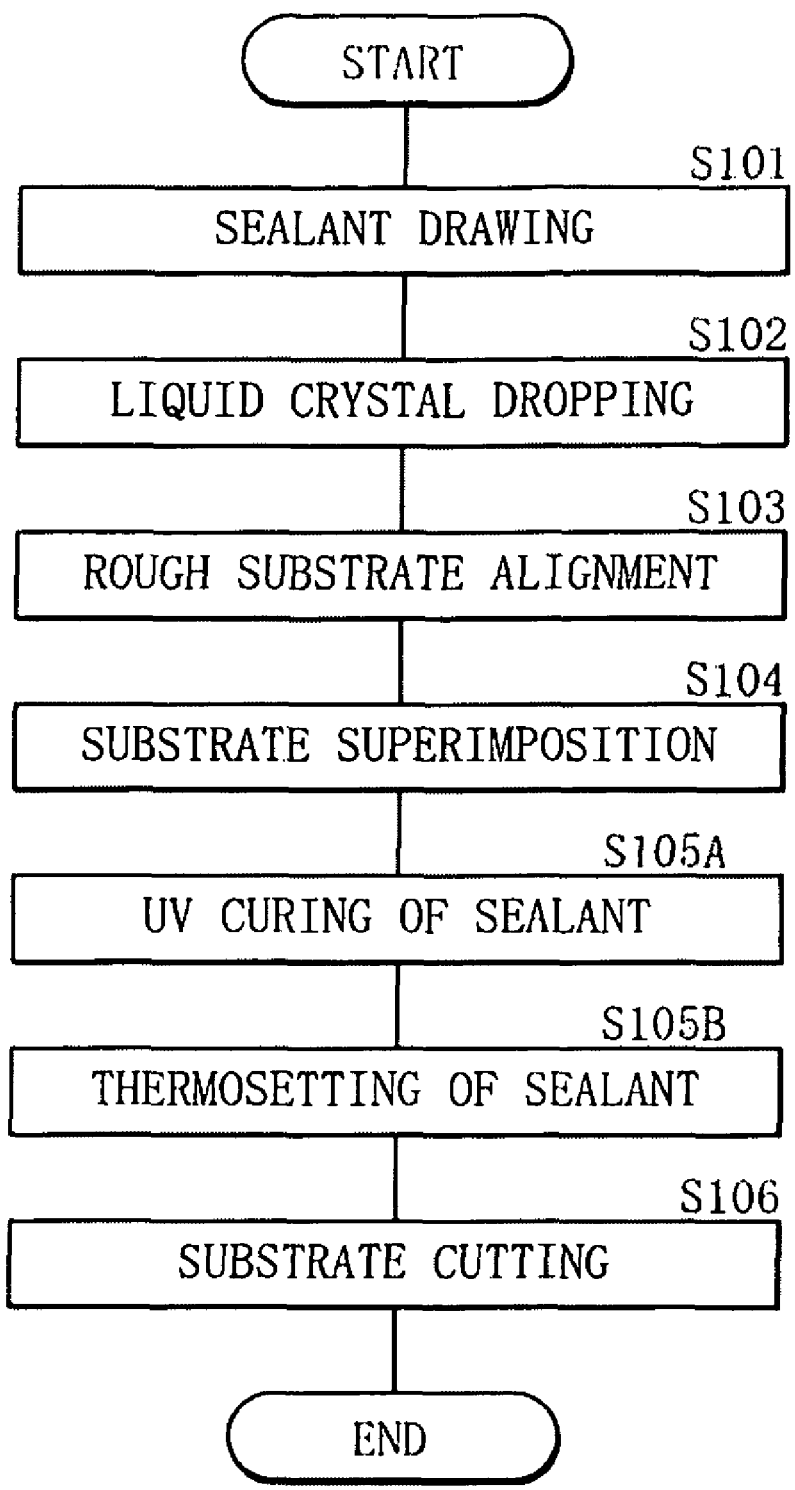
FIG. 6 is a flow chart for describing a one drop fill method.

After the large TFT substrate 14 and the large opposed substrate 15 are formed, the liquid crystal display panel 1 is formed according to the flow chart of a one drop fill method illustrated in FIG. 6. As a large substrate to be subjected to sealant drawing, one of the large TFT substrate and the large opposed substrate 15 is used, and for the sake of convenience, the case where the large opposed substrate 15 is coated with a combination type sealant 8a satisfying the above-described conditions will be described as an example. That is, sealant drawing using the sealant 8a is performed on the large opposed substrate 15 so that the display region 11A is surrounded by the sealant 8a (step S101). Next, a necessary amount of the liquid crystal is dropped in a frame of the large opposed substrate 15 (step S102). Next, the large TFT substrate 14 and the large opposed substrate 15 are introduced into a bonding apparatus to be roughly aligned (step S103), and then the large TFT substrate 14 and the large opposed substrate 15 are superimposed on each other (step S104). After that, an accumulated UV light dose necessary for curing is applied to the sealant 8a (step S105A), and the sealant 8a is thermally cured under a predetermined heating condition (step S105B). Then, the large TFT substrate 14 and the large opposed substrate 15 are cut into substrates with a panel size (step S106). Each of the steps will be described in detail below.

1. Sealant Drawing

Figure 7:
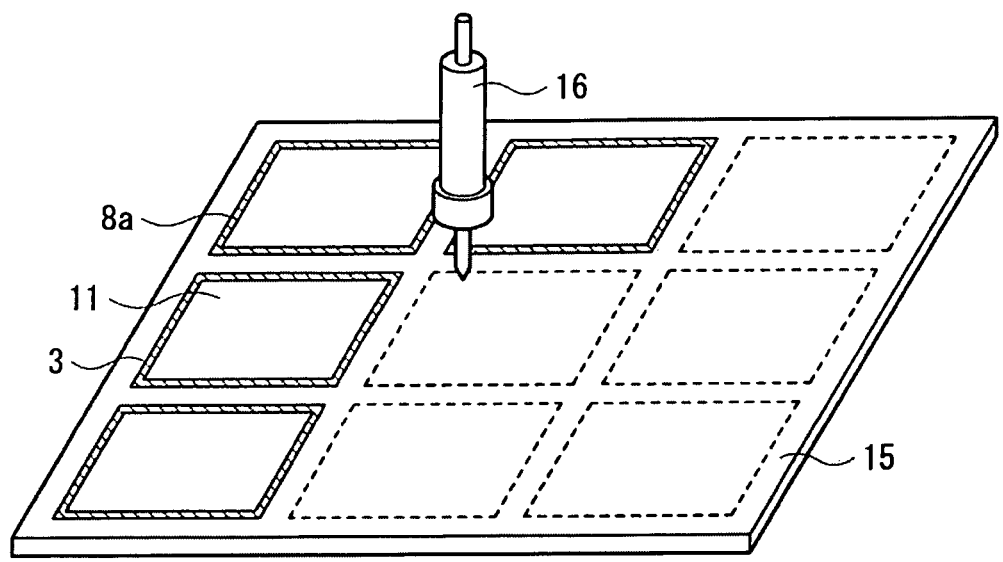
FIG. 7 is an illustration of a step of sealant drawing.

FIG. 7 illustrates a step of drawing the sealant 8a on a large substrate. The UV-curable sealant 8a is applied to a surface of the large substrate so that the display region 11A which seals the liquid crystal of each panel is surrounded by the UV-curable sealant 8a. At this time, an amount of the sealant 8a based on a sealing line width and a gap for the liquid crystal layer 9 is applied from a seal dispenser 16 to the light-shielding film 12 formed on the large opposed substrate 15.

2. Liquid Crystal Dropping

Figure 8:
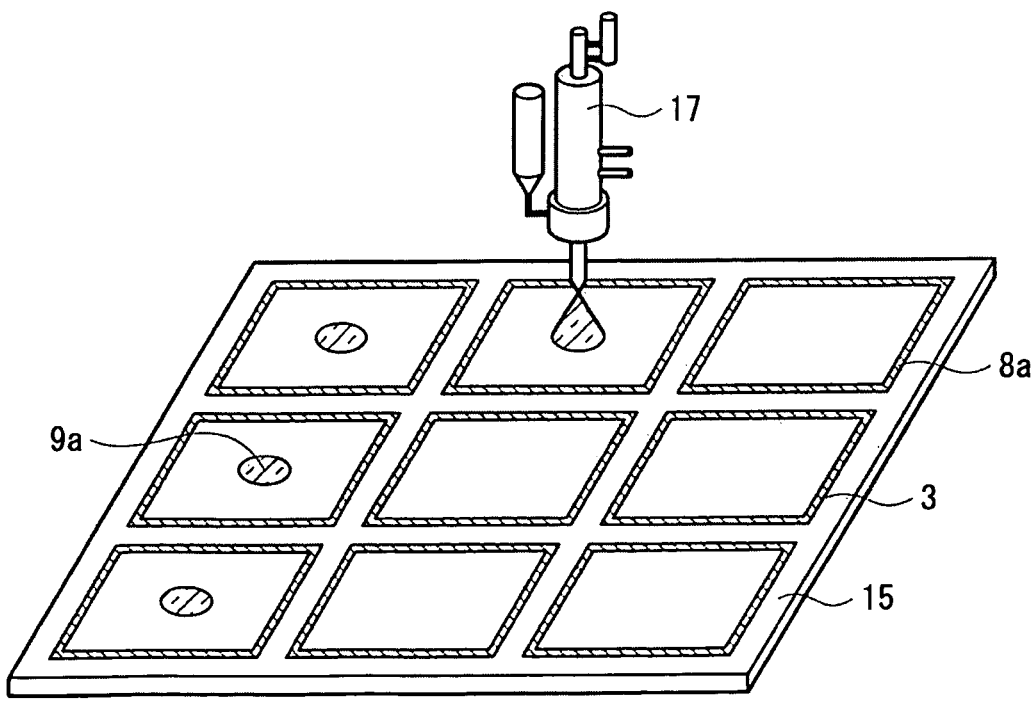
FIG. 8 is an illustration of a step of liquid crystal dropping.

FIG. 8 illustrates a step of dropping a liquid crystal on the large opposed substrate 15. A liquid crystal 9a is dropped from a liquid crystal dispenser 17 in each region surrounded by the sealant 8a of the large opposed substrate 15, that is, each opposed substrate 3 (each panel). At this time, the liquid crystal 9a may be dropped at one point or a few points.

3. Rough Substrate Alignment

Figure 9:
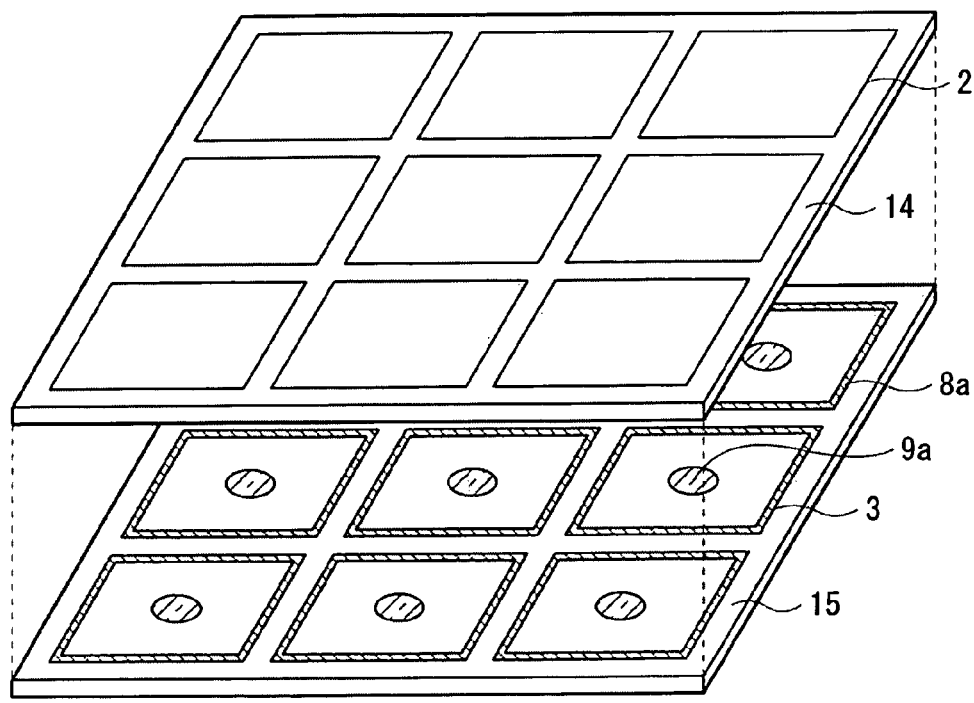
FIG. 9 is an illustration of a step of rough substrate alignment.

FIG. 9 illustrates a step of roughly aligning the large TFT substrate 14 and the large opposed substrate 15. The large opposed substrate 16 on which the liquid crystal 9a is dropped is placed on a stage in the bonding apparatus (not illustrated). On the other hand, the large TFT substrate 14 is delivered into the apparatus, and is supported by a support in the apparatus. Next, an exhaust valve of the apparatus is opened, and air is evacuated from an exhaust outlet, thereby a processing chamber in the apparatus is brought into a reduced pressure state. Next, the large TFT substrate 14 and the large opposed substrate 15 are arranged so as to face each other, and they are slightly pressurized to be roughly aligned.

4. Substrate Superimposition

Figure 10:
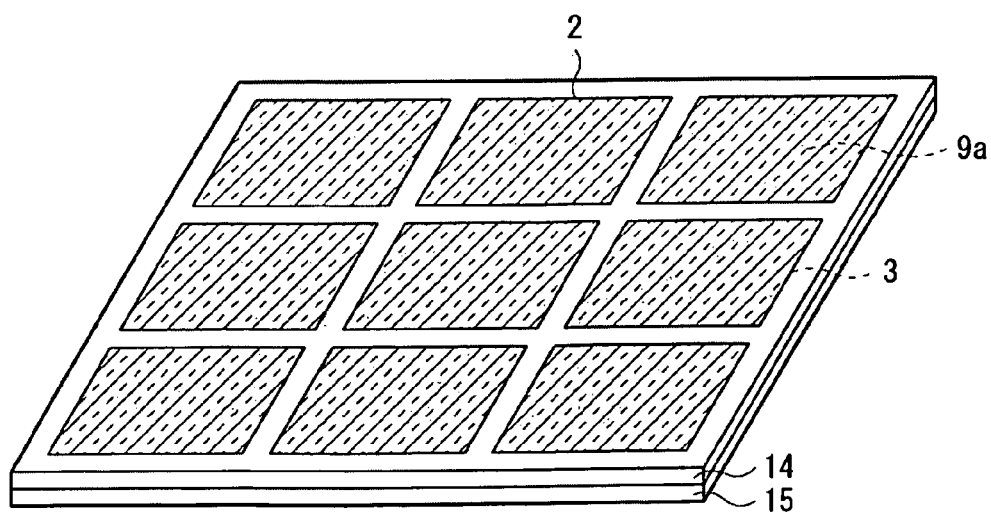
FIG. 10 is an illustration of a step of substrate superimposition.

FIG. 10 illustrates a step of precisely superimposing the large TFT substrate 14 and the large opposed substrate 15. More specifically, the large TFT substrate 14 and the large opposed substrate 15 which are roughly aligned are brought into the air, and then they are precisely aligned so that the pixel regions 11A of the large TFT substrate 14 and the large opposed substrate 15 face each other. In this step, the dropped liquid crystal 9a is spread to substantially the whole region surrounded by the sealant 8a to form the liquid crystal layer 9.

5. Sealant Curing

Figure 11:
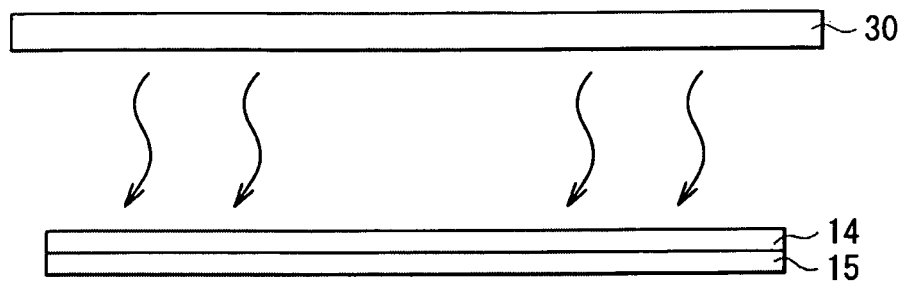
FIG. 11 is an illustration of a step of UV irradiation.

FIG. 11 illustrates a step of applying UV light to superimposed substrates to cure the sealant. The liquid crystal 9a is sealed in a gap between the TFT substrate 2 (for one panel) and the opposed substrate 3 (for one panel) by the sealant 8a. After that, an ultraviolet ray is applied to the sealant 8a by an UV irradiation apparatus 30 under a condition sufficiently curing the sealant 8a, for example, with a UV irradiation dose of 5000 mJ. At this time, the ultraviolet ray enters from the large TFT substrate 14, and reaches the sealant 8a from the space 13b between the wires 13a of the surrounding wire 13.

In addition, it is necessary to cure the sealant 8a by light without damaging an organic material such as the liquid crystal or the alignment film at this time. For example, as an UV lamp of the UV irradiation apparatus, a metal halide lamp is preferably used, and an LED matrix UV light source or a high-pressure mercury lamp may be used. Moreover, in the case where the sealant 8a is of a combination type, after UV irradiation, the sealant 8a is cured by heat treatment under conditions thermally curing the sealant 8a sufficiently, for example, at a temperature of 130° C. for two hours.

6. Substrate Cutting

Figure 12:
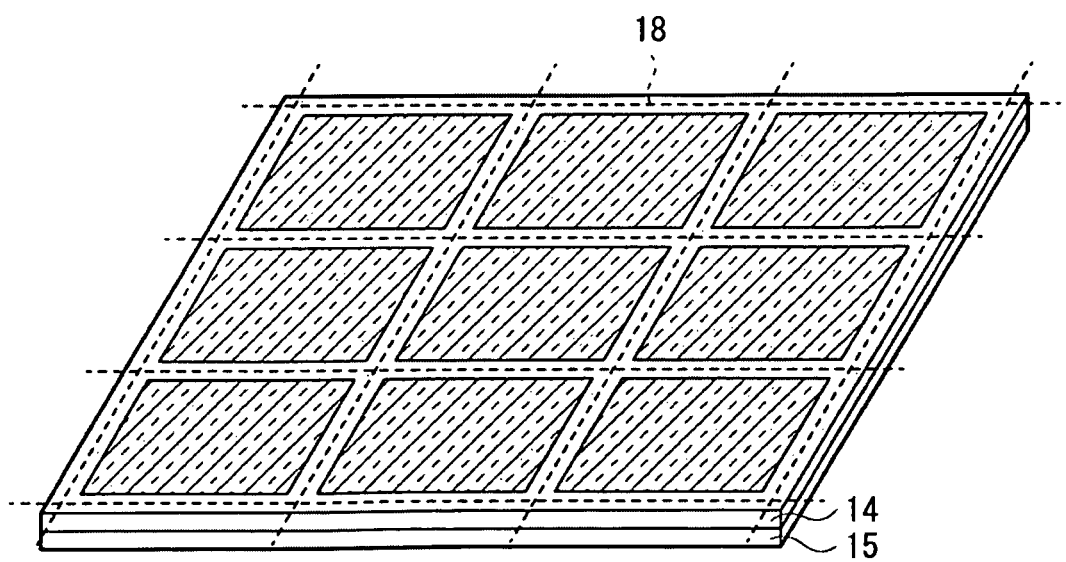
FIG. 12 is an illustration of a step of substrate cutting.

FIG. 12 illustrates a step of cutting the large substrates into panels. In other words, the large TFT substrate 14 and the large opposed substrate 15 which are bonded together are cut along scribe lines 18 into pieces with a panel size.

The liquid crystal display 1 illustrated in FIG. 1 is completed through the above-described steps. Thus, in the embodiment, as a sealant sealing the liquid crystal layer 9 between the TFT substrate 2 and the opposed substrate 3, a light-curable resin or a combination type resin with a wavelength peak of 320 nm to 420 nm and including 0.01 to 1 wt % of a photopolymerization initiator is used, so the sealant is efficiently curable. In other words, the elution of the sealing component into the display region (an active area) is preventable, and a liquid crystal display with high reliability is allowed to be provided.

Second Embodiment

Figure 14:
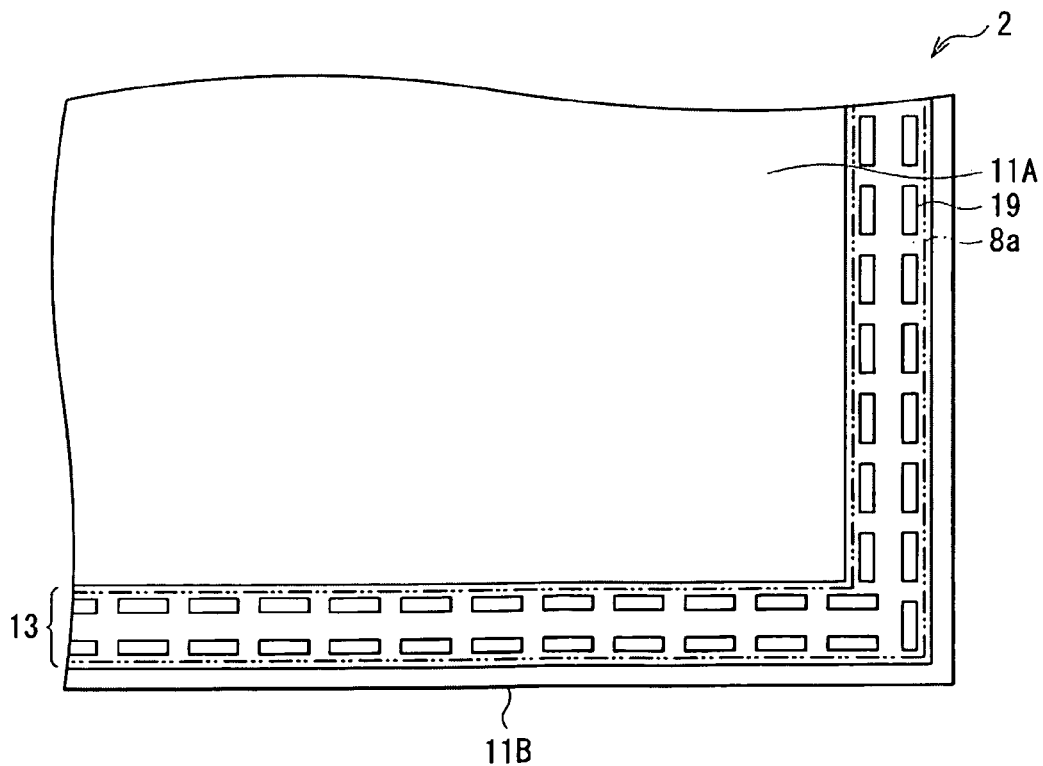
FIG. 14 is a plan view illustrating a configuration of a TFT substrate according to a second embodiment.

As illustrated in FIG. 14, in a second embodiment, an opening 19 for allowing an ultraviolet ray to pass therethrough is arranged in the surrounding wire 13. In such a configuration, in the embodiment, an ultraviolet ray passes through the opening 19, thereby the sealant 8a is curable efficiently for a short time. In addition, other components and other steps are the same as those in the first embodiment, and will not be further described.

Figure 15:
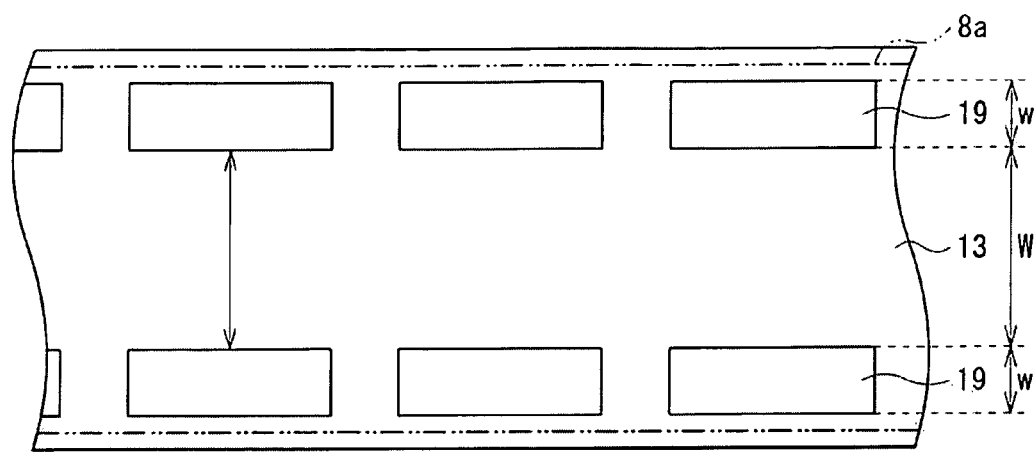
FIG. 15 is an illustration of a relationship between a wire on the TFT substrate and an opening.

FIG. 15 describes an example of the size of the opening 19 with respect to the wire 13a. Here, the width of the opening 19 is defined as w (μm), and the width of a substantial current path of the wire 13a in the case where the opening 19 is arranged is defined as W (μm). The following three examples of W/w were studied.

W/w=90/10 <Design A>, 190/10 <Design B>, 195/5 <Design C>

In Designs A and B, a light-curing reaction progressed by the opening 19 even in a part where light was not sufficiently applied, thereby a sufficient curing rate was obtained. The same holds true in Design C, but in Design C, it is desirable that an end of the sealant 8a and the opening 19 come into contact with each other.

It is clear from the above-described results that when the opening 19 is arranged in the surrounding wire 13, the sealant 8a is curable efficiently for a short time. Thereby, the reliability of the panel is further improved.

Figure 16:
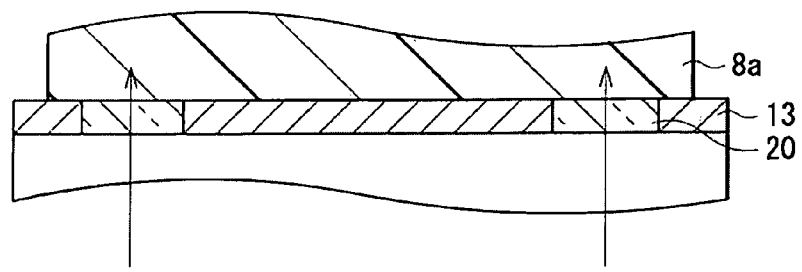
FIG. 16 is a sectional view illustrating a modification of the second embodiment.

Moreover, in the embodiment, as illustrated in FIG. 16, a transparent layer 20 made of a conductive material allowing an ultraviolet ray to pass therethrough such as ITO may be buried in the opening 19. The conductive transparent layer 20 is preferably arranged in the opening 19, because the wire resistance is reduced, compared to an example in FIG. 14.

Although the present invention is described referring to the embodiments, the invention is not limited thereto, and may be variously modified. For example, in the above-described embodiments, the invention is described based on small- to medium-size direct view type liquid crystal display panels, but the invention is applicable to large-size direct view type liquid crystal panels. Moreover, the invention is applicable to not only direct view type liquid crystal displays but also liquid crystal panels of projection type liquid crystal projectors in the same manner. Further, the invention is applicable to not only transmissive liquid crystal panels but also semi-transmissive liquid crystal panels and reflective liquid crystal panels.

Moreover, in the second embodiment, the opening 19 has a rectangular shape, but the opening 19 has an arbitrary shape, and the shape of the opening 19 may be variously changed to, for example, a square shape, a circular shape or an elliptical shape depending on the state of wiring design around the panel. The size of the opening is not limited to the above-described design examples A to C, and as long as an opening ratio is allowed to be secured, any design example may be used.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display comprising:
a pair of substrates having display regions in positions facing each other and having surrounding regions around the display regions, respectively, one of the pair of substrates including a wire made of a material blocking an ultraviolet ray in the surrounding region;
a liquid crystal layer sandwiched between the pair of substrates; and
a sealing layer arranged so as to overlap a part or the whole of the wire in a direction where the pair of substrates face each other, and sealing the liquid crystal layer,
wherein the sealing layer is made of a light-curable resin or a combination type resin and includes a photopolymerization initiator, and
the content of the photopolymerization initiator is within a range of 0.01 wt % to 1 wt %, in which wt % is weight percent, and the photopolymerization initiator has a wavelength peak within a range of 320 nm to 420 nm.

2. The liquid crystal display according to claim 1, wherein the wire has an opening.

3. The liquid crystal display according to claim 2, wherein a transparent conductive layer allowing an ultraviolet ray to pass therethrough is buried in the opening of the wire.

4. The liquid crystal display according to claim 1, wherein one or both of the pair of substrates have a light-shielding film, and the light-shielding film and the sealing layer overlap each other in a direction where the pair of substrates face each other.

5. A method of manufacturing a liquid crystal display comprising the steps of:
forming a sealing layer with a ring shape in a surrounding region of one of a pair of substrates, the sealing layer being made of a light-curable resin or a combination type resin, the pair of substrates having display regions in positions facing each other and having the surrounding regions around the display regions, respectively, one of the pair of substrates including a wire made of a material blocking an ultraviolet ray in the surrounding region;
dropping a liquid crystal in a region surrounded by the sealing layer;
superimposing the pair of substrates under a reduced pressure, and then returning the pressure to an atmospheric pressure, thereby to form a liquid crystal layer between the pair of substrates; and
curing the sealing layer by light irradiation after forming the liquid crystal layer,
wherein the light-curable resin or the combination type resin includes a photopolymerization initiator, and
the content of the photopolymerization initiator is within a range of 0.01 wt % to 1 wt %, in which wt % is weight percent, and the photopolymerization initiator has a wavelength peak within a range of 320 nm to 420 nm.

* * * * *